United States Patent
Lam et al.

(10) Patent No.: US 9,723,121 B2
(45) Date of Patent: Aug. 1, 2017

(54) MULTIPLE DEVICES RINGING COORDINATION

(71) Applicant: Verizon Patent and Licensing Inc., Basking Ridge, NJ (US)

(72) Inventors: Andrew Wahlon Lam, Basking Ridge, NJ (US); Jason A. Coglon, Basking Ridge, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 86 days.

(21) Appl. No.: 14/661,087

(22) Filed: Mar. 18, 2015

(65) Prior Publication Data
US 2016/0277581 A1  Sep. 22, 2016

(51) Int. Cl.
| | |
|---|---|
| H04M 1/00 | (2006.01) |
| H04M 1/725 | (2006.01) |
| H04M 3/02 | (2006.01) |
| H04M 3/42 | (2006.01) |
| H04M 3/46 | (2006.01) |

(52) U.S. Cl.
CPC ..... H04M 1/72527 (2013.01); H04M 1/7253 (2013.01); H04M 3/02 (2013.01); H04M 3/42255 (2013.01); H04M 3/465 (2013.01); H04M 2203/2094 (2013.01)

(58) Field of Classification Search
CPC ..... H04W 4/00; H04M 19/04; H04M 19/041; H04M 19/042; H04M 1/72519
USPC .................................. 455/417, 567, 552.1
See application file for complete search history.

(56) References Cited

U.S. PATENT DOCUMENTS

| | | | | |
|---|---|---|---|---|
| 2006/0177044 | A1* | 8/2006 | O'Neil | H04M 3/02 379/373.02 |
| 2009/0181639 | A1* | 7/2009 | Glanton | H04W 4/22 455/404.1 |
| 2012/0172058 | A1* | 7/2012 | O'Reilly | H04W 4/22 455/456.3 |
| 2015/0195692 | A1* | 7/2015 | Chow | H04M 19/04 455/414.1 |
| 2016/0036863 | A1* | 2/2016 | Cook | H04W 4/16 370/328 |

* cited by examiner

Primary Examiner — Temica M Beamer

(57) ABSTRACT

A method includes accessing, at a first user device, an application that coordinates ringing of multiple user devices registered to a smart phone number that are within a predetermined proximity of each other. The method includes broadcasting an identity and a ring state associated with the user device. A presence is to be detected within the predetermined proximity of at least one additional user device associated with the smart phone number. The method includes determining a ringing user device based on predetermined rules of selection between the at least one additional user device and the first user device. The method further includes determining activity to be performed by at least one other user device in event of an incoming call to the smart phone number. The method also includes receiving an incoming call at the smart phone number and ringing the ringing device.

20 Claims, 8 Drawing Sheets

| SINGLE USER IDENTITY 710 | DEVICE ID 720 | RING STATE 730 | TIME STAMP 740 |
|---|---|---|---|
| NAME, TELEPHONE NUMBER EMAIL ADDRESS, USER ID | DEVICE A | VIBRATE | TIME STAMP 3 |
| | DEVICE B | SILENT | TIME STAMP 5 |
| | DEVICE C | ACTIVE | TIME STAMP 6 |
| | DEVICE D | SILENT | TIME STAMP 2 |

500

MULTIPLE DEVICES RINGING COORDINATION

BACKGROUND INFORMATION

Cell phones, personal computers and tablets are consumer electronic devices that are often associated with a single user identity. In addition, smart televisions (TVs), and other devices that are capable of accessing the Internet of Things (IoT) may also be associated with a single user identity. These devices may send and receive information in association with the single user identity over the Internet. In some instances, these devices may include touch displays with which the user may input information to the device. The touch display may protect access to the user device with a security feature, such as a required password.

Voice over long term evolution (VoLTE) for Internet connected devices allows users to use such Internet connected devices to make and receive phone calls from their smart phone phone number. In instances in which there is an incoming phone call to the single user identity, all devices registered to that smart phone number will ring.

DETAILED DESCRIPTION OF PREFERRED EMBODIMENTS

The following detailed description refers to the accompanying drawings. The same reference numbers in different drawings identify the same or similar elements.

Embodiments described herein relate to devices, methods, and systems for coordinating ringing of multiple user devices registered to a same smart phone number that are within a predetermined proximity of each other. In instances in which there are multiple registered devices within close proximity of each other, when a ringing signal is received, the ringing may be coordinated between the user devices (e.g., to avoid a loud disruption). Each of the user devices may detect the presence of the other devices and coordinate suppression of the ringing based on the ringing signal. For example, the ringing may be coordinated in a manner that the active or recent device will play an audible alert while the other user devices may only display visual indicators (e.g., the screens of the other user devices may light up and allow the user to answer/decline/etc., at the other user devices without playing an audible alert).

Consistent with embodiments, the multiple user devices may each include a capability to broadcast a ring status associated with each user device and to scan to determine the presence of other user devices. A ringing coordination application may be launched on each device and configured to broadcast a private identity hash alongside a "ring state" and other information (e.g., a last used time stamp, capabilities associated with the device for the type of call, etc.) that may be used to determine a receiver/listener for broadcasts. In some implementations, the ringing coordination application may be integrated into an operating system of the respective devices. In instances in which user devices are within the predetermined proximity of each other, the user devices may peer connect to one another and coordinate ringing based on predetermined rules for selecting a user device to ring and activity to be implemented at other user devices.

Figure 1:
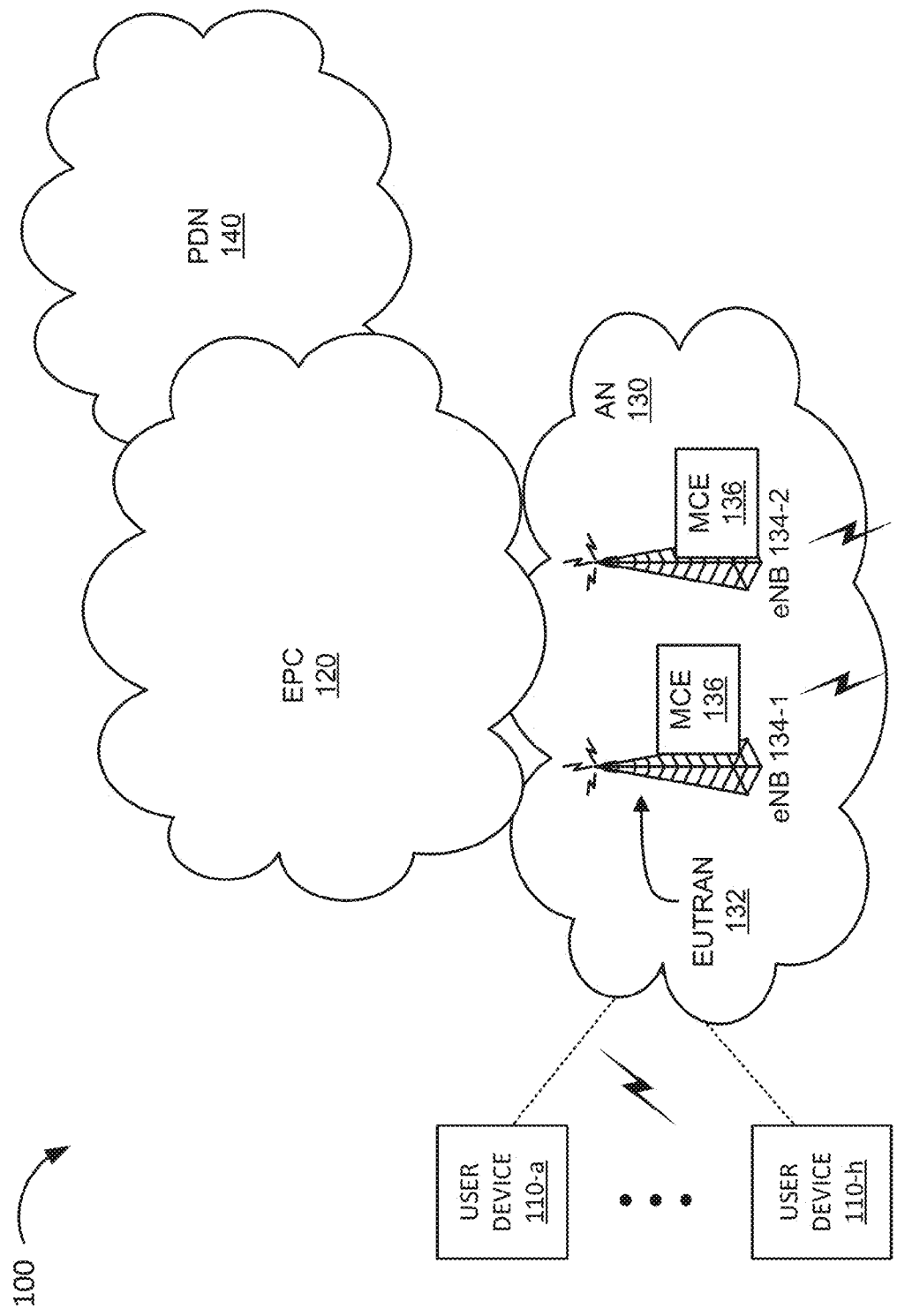
FIG. 1 is a diagram illustrating an exemplary environment including multiple user devices registered to a same smart phone number within proximity of each other according to an implementation described herein.

FIG. 1 is a diagram of an environment 100 in which the systems and/or methods described herein may be implemented. As shown in FIG. 1, environment 100 may include multiple user devices 110a-110h (referred to in singular as user device 110 and in plural as user devices 110) within a predetermined proximity of each other that may receive a ring signal associated with a single user identity (or smart phone number), an evolved packet core (EPC) network 120, an access network (AN) 130, and a packet data network (PDN) 140, such as the Internet or a proprietary packet data network. Two user devices 110, a single EPC 120, AN 130, and PDN 140 have been illustrated in FIG. 1 for simplicity. In practice, there may be more or fewer devices or components. For example, a typical environment 100 may include millions of subscriber user devices 102.

User device 110 may include Internet connected devices that allow users to access voice over long term evolution (VoLTE) services to make and receive phone calls from a phone number (e.g., a smart phone number) associated with a single user identity. User device 110 may include, for example, a smart phone, a smart watch, a tablet computer, a personal computer, a laptop computer, a gaming console, an Internet television, or other types of computation or communication devices. Multiple user devices 110 may be associated with a single user identity. In instances in which there is an incoming phone call, all user devices 110 registered to that smartphone number will ring. As described herein, for example with respect to FIGS. 3-8, user devices 110 may include a coordinated ringing application that may coordinate ringing of user devices 110 that receive a ringing signal associated with the single user identity when user devices 110 are within a predetermined proximity of each other. Coordinated ringing may include suppression of ringing at all but a particular selected user device 110.

EPC 120 may include a core network architecture of the Third generation partnership project (3GPP) LTE wireless communication standard. EPC 120 may include components or devices (not shown separately) that enable communication via user devices 110, such as a mobility management entity (MME), a serving gateway (SGW), and a PDN gateway (PGW). A broadcast multicast service center (BMSC), and a multimedia broadcast multicast service gateway (MBMS GW) may also be deployed in EPC 120.

AN 130 may include an evolved universal terrestrial radio access network (E-UTRAN) 132 and a number of eNodeBs (eNBs) 134-1 and 134-2 or enhanced node base stations (collectively referred to as eNBs 134 or individually as eNB 134). Each eNB 134 may include a corresponding multicast coordination entity (MCE) 136. Access network 130 includes a communications network that connects subscribers (e.g., user device 110) to a service provider. In one example, access network 130 may include a Wi-Fi network or other access networks (e.g., in addition to E-UTRAN 132).

eNBs 134 includes network devices that operate according to one or more versions of the LTE communication standard. For example, eNBs 134 may be configured to respond to requests from user devices 110, forward information regarding user devices 110 to EPC 120, etc.

PDN 140 includes a network that provides data services (e.g., via packets or any other Internet protocol (IP) datagrams). For example, PDN 140 may include the Internet, an intranet, an asynchronous transfer mode (ATM) network, etc. PDN 140 includes a network that provides data services (e.g., via packets or any other Internet protocol (IP) datagrams). For example, In implementations described herein, multiple user devices associated with a single user identity may receive a telecommunications call (e.g., a voice call or a video call) via a network (e.g., the Internet). The systems may coordinate ringing of multiple user devices registered to a same smart phone number that are within a predetermined proximity of each other. In instances in which there are multiple registered devices within close proximity of each other, the ringing may be coordinated to avoid a loud disruption or redundant audible alerts.

Figure 2:
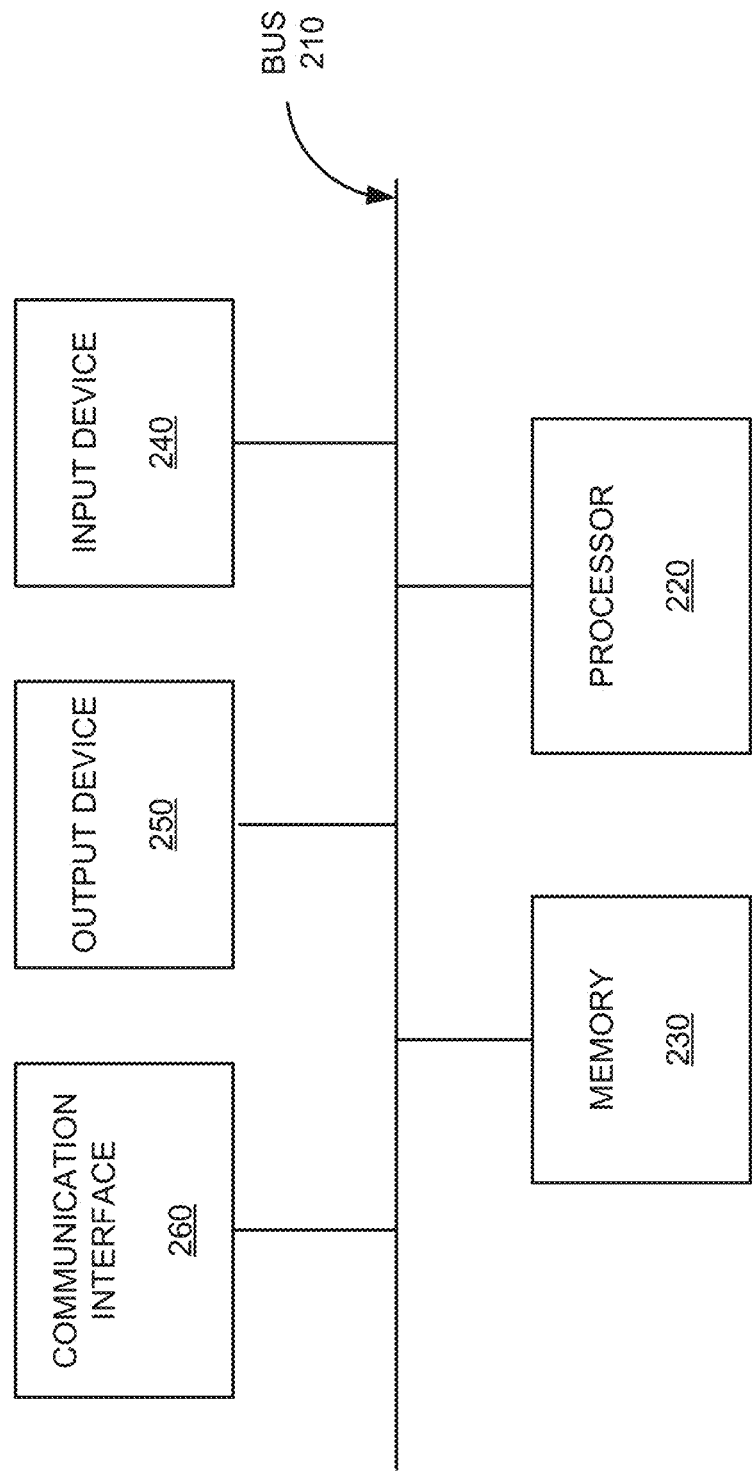
FIG. 2 is a diagram of an exemplary device in which methods and systems described herein may be implemented.

FIG. 2 is a diagram of example components of a device 200. Each of user device 102, one or more devices in EPC 120, AN 130, E-UTRAN 132, eNB 134, MCE 136, or PDN 140, as described in FIG. 1 above, may include one or more devices 200. As shown in FIG. 2, device 200 may include a bus 210, a processor 220, a memory 230, an input device 240, an output device 250, and a communication interface 260.

Bus 210 may permit communication among the components of device 200. Processor 220 may include one or more processors or microprocessors that interpret and execute instructions. In other implementations, processor 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processor 220, a read only memory (ROM) or another type of static storage device that stores static information and instructions for the processor 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of environment 100.

As described herein, device 200 may perform certain operations in response to processor 220 executing machine-readable instructions contained in a computer-readable medium, such as memory 230. A computer-readable medium may be defined as a non-transitory memory device. A memory device may include space within a single physical memory device or spread across multiple physical memory devices. The machine-readable instructions may be read into memory 230 from another computer-readable medium or from another device via communication interface 260. The machine-readable instructions contained in memory 230 may cause processor 220 to perform processes described herein. Alternatively, hardwired circuitry may be used in place of or in combination with machine-readable instructions to implement processes described herein. Thus, implementations described herein are not limited to any specific combination of hardware circuitry and software.

Figure 3:
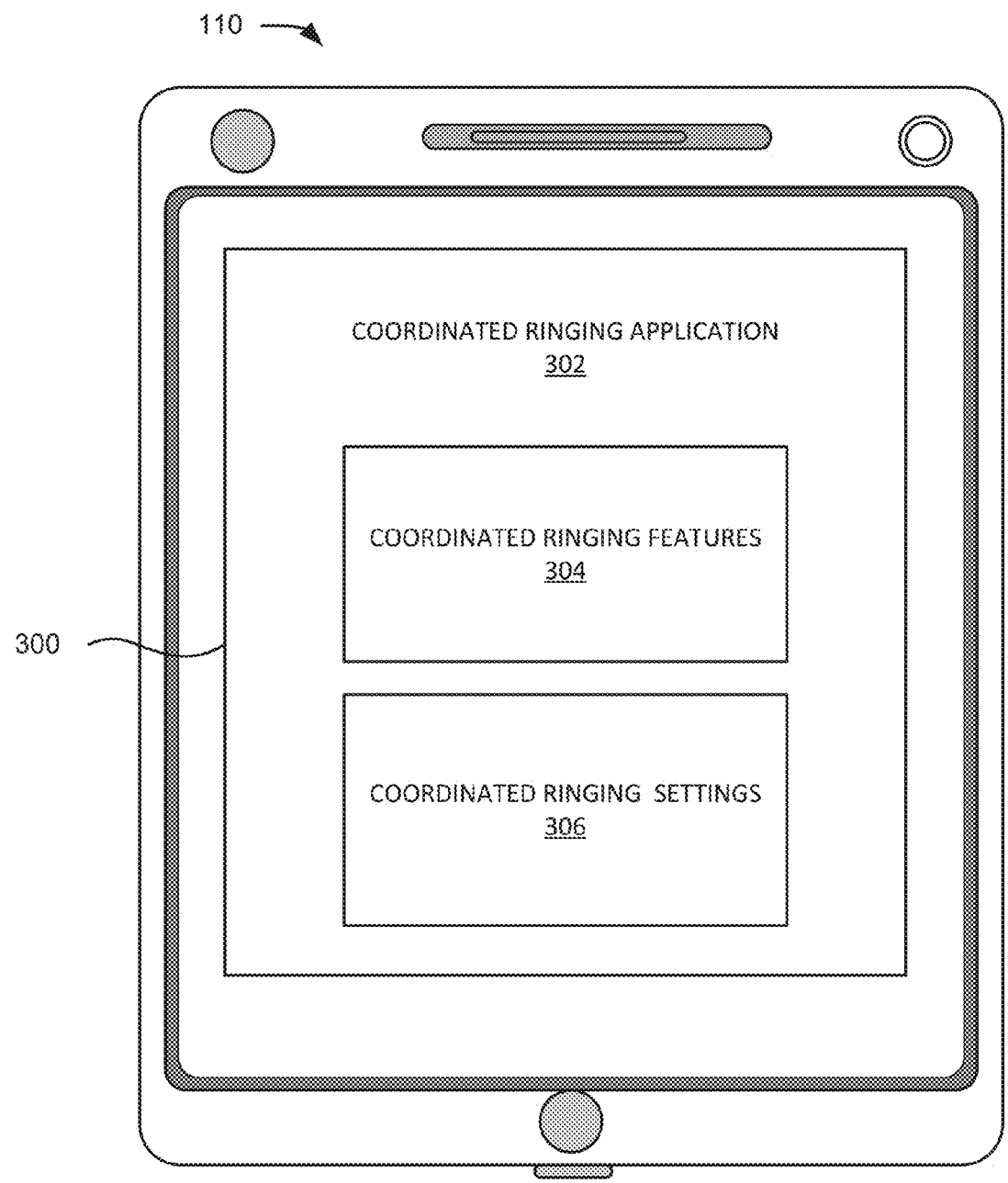
FIG. 3 is a diagram of an exemplary device displaying a graphical user interface (GUI) associated with a coordinated ringing application.

FIG. 3 is a diagram of an exemplary user device 110 displaying a coordinated ringing control graphical user interface (GUI) 300 associated with a coordinated ringing application 302. Coordinated ringing control GUI 300 illustrates visual elements associated with functional aspects of coordinated ringing application 302, such as coordinated ringing features 304 and coordinated ringing settings 306, which may be accessed or displayed via coordinated ringing control GUI 300. Although not shown separately, each of coordinated ringing features 304 and coordinated ringing settings 306 may include multiple associated visual elements that may be displayed in association with the selected or active functional aspects of coordinated ringing application 302.

As shown in FIG. 3, coordinated ringing control GUI 300 may include an input/output interface associated with the coordinated ringing application 302. User device 110 may include coordinated ringing application 302 as preinstalled machine-readable instructions (e.g., provided by a manufacturer of user device 110). Alternatively, users may download digital coordinated ringing application 302 from a service provider or an associated database.

Coordinated ringing application 302 may be launched on a user device 110, which includes a capability to broadcast an identity and detect the proximity of other user devices 110 broadcasting respective identity information (e.g., via Bluetooth™). Coordinated ringing application 302 may provide an interface and access to controls for coordinated ringing of user devices 110 associated with a particular single user identity (or smart phone number). For example, the user may be provided the capability to select among different choices and provide different input that controls the coordination of ringing between multiple user devices 110. Coordinated ringing application 302 may support coordinated ringing features 304 associated with coordinated ringing of multiple user devices 110. Coordinated ringing application 302 may also provide access to coordinated ringing settings 306 with which a user may coordinate ringing of user devices 110 associated with the single user identity.

Coordinated ringing features 304 may include designation of a single user device 110 (or combination of user devices 110) from among multiple user devices 110 to ring based on an incoming ring signal and to suppress ringing of others of the multiple user devices 110 when the user devices 110 are within a predetermined proximity of each other. Alternatively, coordinated ringing features 304 may include selection of a single user device 110 from among the user devices 110 based on a motion (or relative motion) associated with the user devices 110 (e.g., a last user device 110 to register motion may be selected to ring or alternatively the device that has least recently moved may be selected to ring).

Coordinated ringing features 304 may include activity or behavior that user devices 110 which are not designated to ring are required to display on GUI 300 based on an incoming ring signal. In addition to visual elements that may alert the user and provide access to functionality associated with each phone call, coordinated ringing features 304 may include aural (e.g., ringing) or tactile output from the user device 110. For example, the displays of the other user devices 110 may light up and provide visual elements associated with telephone features (i.e., in GUI 300) via which the user may access the incoming call. Alternatively, the other user devices 110 may ring at a lower volume or less frequently (e.g., longer breaks between each ring). Coordinated ringing features 304 may include that the other user devices 110 may vibrate in lieu of or in addition to audible ringing. In some instances, when the user answers the call, the other user devices 110 may provide ongoing access to the call or may provide ability to access (or join the call) for a predetermined time. Further, in such instances, any audible ringing or alerts relating to the call on the other user devices may be discontinued, so as not to interrupt the call.

Coordinated ringing settings 306 may provide a capability for the user to select particular coordinated features 304 or combination of features 304. Coordinated ringing settings 306 may include selection of particular user devices 110 to ring based on a location associated with each user device in the group of user devices 110 (e.g., based on a global position system (GPS) location of the user devices 110). For example, the GPS location based selection of precedence may allow the user to receive calls on a particular user device 110 when at home and at another user device 110 when at work or away from home. Coordinated ringing settings 306 may allow the user to define proximity between the user devices 110. For example, the user may input instructions to define the distance (or minimum strength of signal associated with the other user device 110) between user devices 110 at which coordination (or suppression) of ringing is to be implemented. In other words the user may input instructions that define the maximum distance of the predetermined proximity.

Coordinated ringing settings 306 may allow the user to select a particular user device 110 to receive a call based on type of call and/or identity of caller. Coordinated ringing settings 306 may allow the user to select particular ring tones whenever a particular combination of user devices 110 are within proximity of each other (e.g., a different ring tone for the designated receiving user device 110 than used in other instances based on the devices being in proximity of each other).

Figure 4:
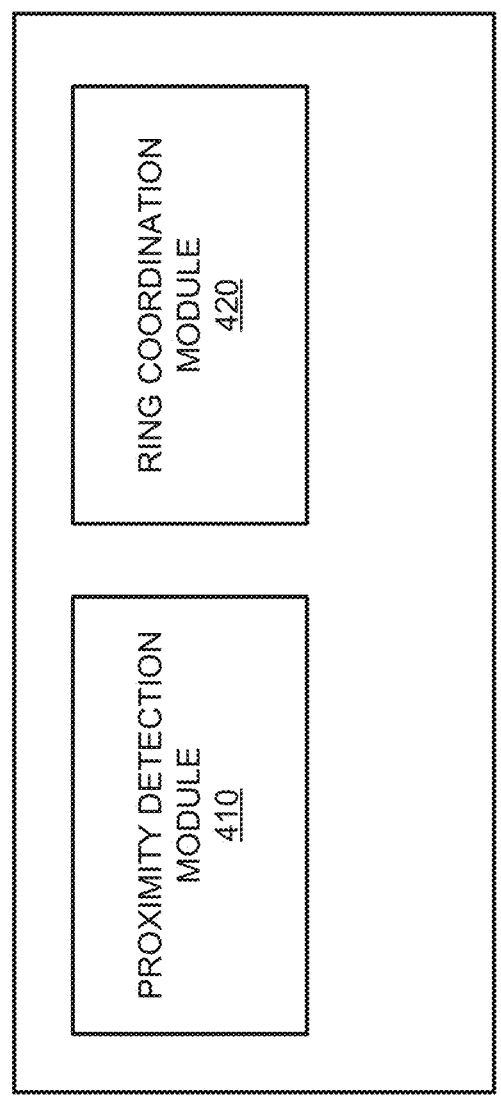
FIG. 4 is a diagram illustrating an exemplary functional block diagram of a user device including a coordinated ringing application.

FIG. 4 is an exemplary functional block diagram of a user device 110 that includes a coordinated ringing application 302. As shown in FIG. 4, user device 140 may include a proximity detection module 410 and a ring coordination module 420.

Proximity detection module 410 may scan to determine the presence of additional user devices 110, such as described herein below with respect to FIG. 5. Proximity detection module 410 may detect the proximity of other user devices 110 and broadcast information that may allow coordinated ringing application 302 to identify a ring state (i.e., ringing status or whether the user device 110 is to ring for incoming calls) of other user devices 110 associated with a single user identity. The ring state may include information regarding particular conditions under which each of the user devices 110 is scheduled to ring on incoming calls.

Ring coordination module 420 may coordinate ringing among the user devices 110 in instances in which the user devices 110 are determined to be within proximity of each other, such as described herein below with respect to FIG. 6. Ring coordination module may incorporate instructions provided via coordinated ringing settings 306 to determine times, manners and activities of user devices 110 when receiving a ringing signal within proximity of each other. For example, ring coordination module 420 may determine that a particular user device 110 is to ring when the user devices 110 are within the presence of each other.

Figure 5:
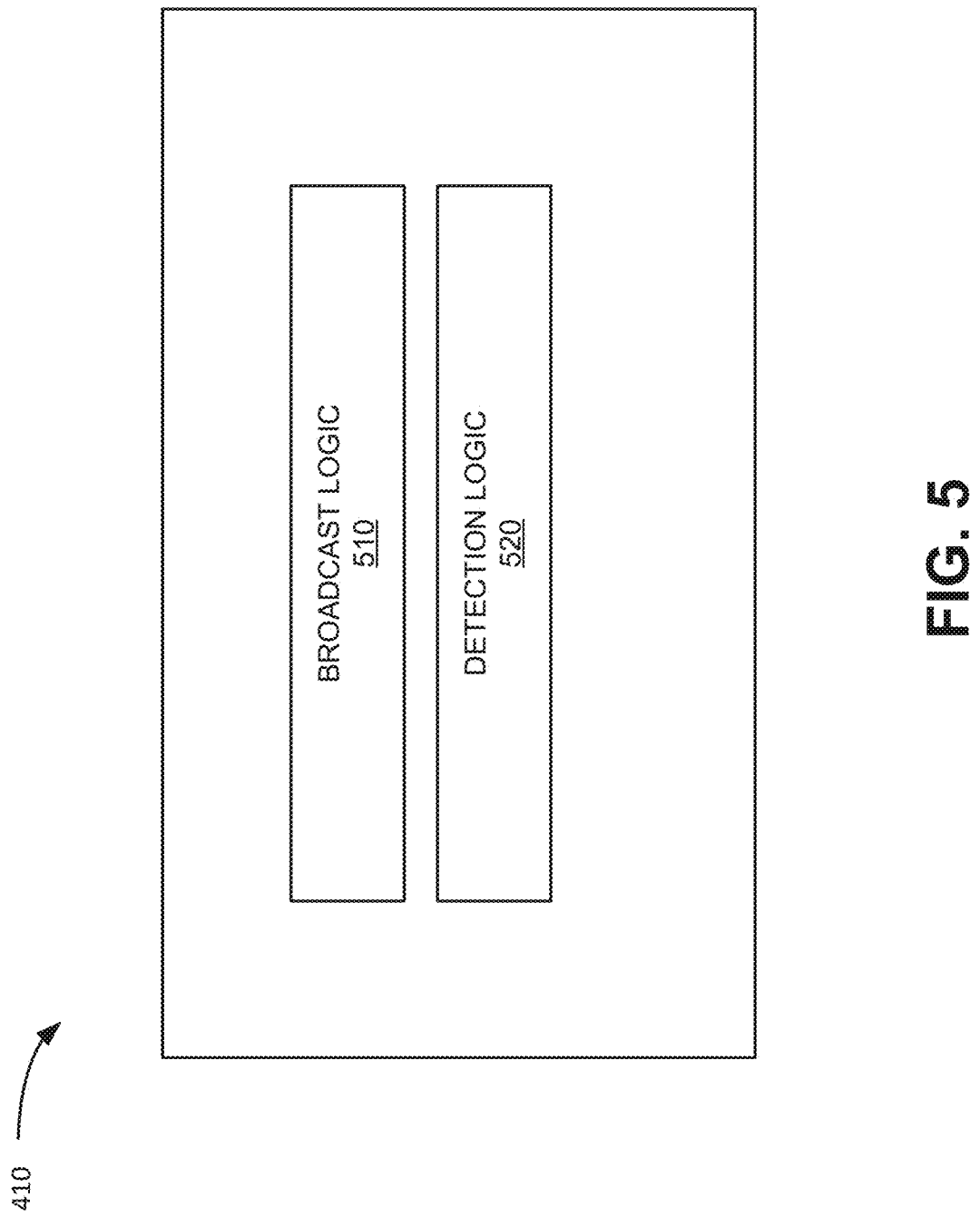
FIG. 5 depicts a functional block diagram of the proximity detection module of FIG. 4.

FIG. 5 is an exemplary functional block diagram of proximity detection module 410. As shown in FIG. 5, proximity detection module 410 may include broadcast logic 510 and detection logic 520. The particular arrangement and number of components of proximity detection module 410 as shown in FIG. 5 are illustrated for simplicity.

Broadcast logic 510 may broadcast the ring state of the user device 110 associated with a single user identity. In one embodiment, broadcast logic 510 may broadcast the ring state associated with the user device 110 via a ring state server model that includes a private identity hash (e.g., user ID hashed to device ID and time stamp) based on information such as that shown in table 700 in FIG. 7. Broadcast logic 510 may broadcast the private identity hash based on wireless personal network (e.g., a Bluetooth 4.0/Bluetooth low energy (LE) network). For example, broadcast logic 510 may broadcast the private identity hash alongside the ring state and a "last used timestamp".

Detection logic 520 may act as a receiver/listener for broadcasts of private identity hash from other user devices 110. Detection logic 520 may determine that the additional user devices 110 are within the predetermined proximity based on an ascertained physical distance between the user devices 110. Proximity may be defined based on presence, distance between user devices 110 or relative strength of signal detected by detection logic 520. For example, detection logic 520 may receive a location of the other user device 110 and compare the location of the other user device 110 to a location of the user device 110 in which device logic 520 is installed to determine whether the user devices 110 are within the predetermined proximity of each other. In other instances, detection logic 520 may determine that the user devices 110 are within the predetermined proximity based on detection of the other devices 110 or strength of signal associated with the other user devices 110.

Figure 6:
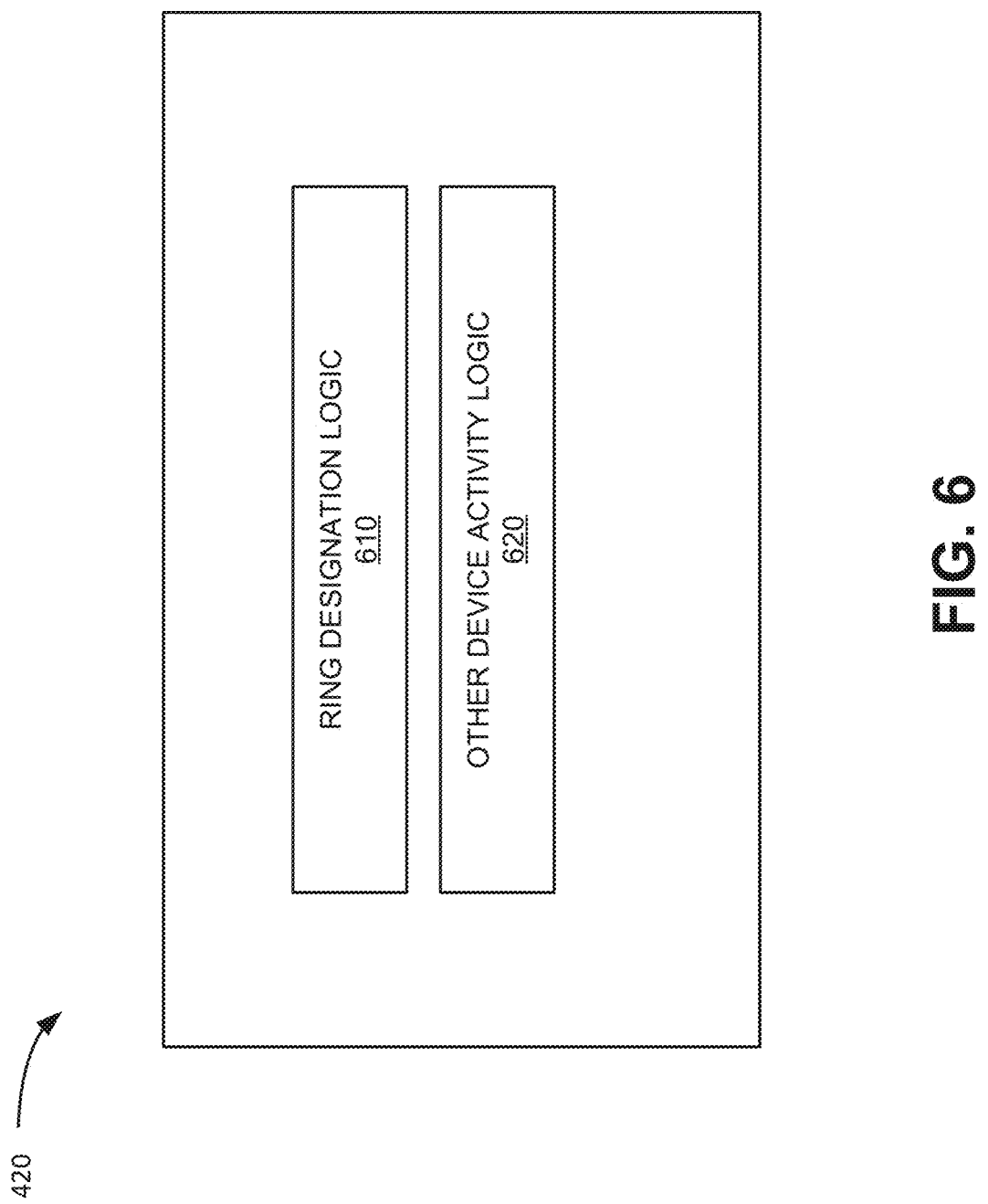
FIG. 6 depicts a functional block diagram of the ring coordination module of FIG. 4.

FIG. 6 is an exemplary functional block diagram of ring coordination module 420. As shown in FIG. 6, ring coordination module 420 may include ring designation logic 610 and other device activity logic 620. Ring coordination module 420 is described with respect to FIG. 7 and identity state hash table 700. The particular arrangement and number of components of ring coordination module 420 as shown in FIG. 6 are illustrated for simplicity.

Ring designation logic 610 may designate user devices 110 to ring based on predetermined rules. For example, ring designation logic 610 may determine that the last user device 110 to have been used is to ring based on a next incoming ring signal. Thus, ring designation logic 610 may mitigate the problem of undue noise from simultaneous ringing when user devices 110 associated with a same smart phone number are in proximity with each other.

Ring designation logic 610 may define the relationship between user devices 110 and the designation of user devices 110 for receiving video or voice calls prior to receiving incoming call. Ring designation logic 610 may constantly monitor to determine changes in conditions that are relevant to determining the designated user device(s) 110 under the predetermined rules. For example, in instances in which selection of the designated ringing user device 110 is dependent on the last motion of a user device 110 that is detected, ring designation logic 610 may determine which of the user devices 110 has moved based on constantly updated accelerometer measurements and other characteristics.

In instances in which a user device 110 (e.g., device A) detects that there is another user device 110 (e.g., device B) with the coordinated ringing application 302 installed and the capability to broadcast an identity associated with the device, device A may compare a private identity hash broadcast by device B to a private identity hash associated with device A to determine whether the devices have the same hash. If the user devices 110 share a same identity hash, the user devices 110 may peer connect to one another and ring designation logic 610 may compare the "last used timestamp" of the user devices 110. Ring designation logic 610 may turn the ringing value to off on the user device 110 (or user devices 110 in instances of more than two user devices 110) whose timestamp is not the most recent. The user device 110 with the most recent time stamp may be the only user device 110 with the ringing value (left) on. In instances in which user devices 110 move out of range of one another, the devices 110 may detect that the user devices 110 are no longer within the predetermined proximity and turn the ringing back on the devices 110.

Figure 7:
FIG. 7 is a table illustrating a private identity hash string state table.

With regard to table 700, shown in FIG. 7, ring designation logic 610 may compare information associated with multiple user devices 110 (e.g., with user device IDs 720, shown in FIG. 7 as device A to device D) that share a single user identity 710 (e.g., associated with a name, email, etc.). Table 700 may represent information stored in one or more of the user devices 110 that may be used to determine ring states for each of the user devices 110. Ring designation logic 610 may access a value 740 associated with each of the devices 720, such as a time stamp. Ring designation logic 610 may determine that device C, which has a latest time stamp (i.e., time stamp 6 may be a later date than time stamps for any of the other user devices 110), is to ring (ring state 730 for device C is active) when an incoming call is received for the smart phone number. The other user devices 110 may be assigned different ring states 730 which include particular behavior instead of ringing (e.g. vibrate, lit up screen, silence, etc.). The ring states of user devices 110 in table 700 may be constantly updated as the time stamp or other relevant value changes to values based on which the ring state is determined.

Referring back to FIG. 6, other device activity logic 620 may determine activity to be implemented (or executed) by other devices 110 associated with the smart phone number that are not designated to ring upon receipt of an incoming ring signal. Other device activity logic 620 may determine that the other user devices 110 are to visually display that the incoming call may be accessed at the other user device(s) 110 while the other user device(s) 110 remains silent. The user may access the call by interacting with a GUI of the other user device 110 (e.g., by pressing a button or touch screen). Other device activity logic 620 may provide an option to join a call that is in progress on another user device 110 (e.g., the designated user device 110 may have answered the call) from other phone or may provide the capability to transfer the call between user devices 110.

Other device activity logic 620 may determine the activity of the other user devices 110. For example, other device activity logic 620 may determine that the other user device 110 is to vibrate. Alternatively, other device activity logic 620 may determine that the other user device 110 is to ring at a lower ring volume or to ring based on ring pattern variations. For example, other device activity logic 620 may determine that different ring tones are to be used at different times or places for different callers or types of calls.

Figure 8:
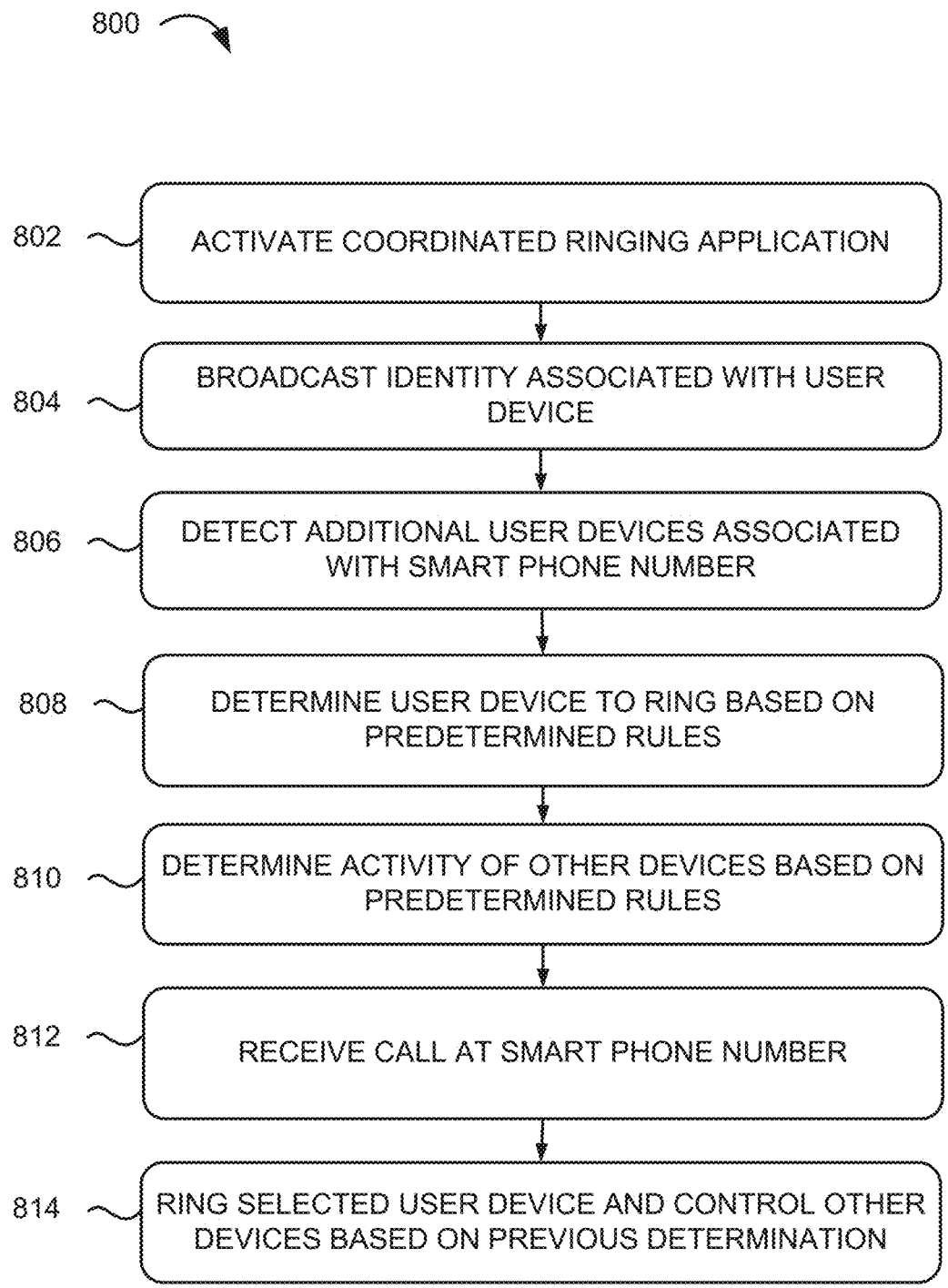
FIG. 8 is a flowchart of an exemplary process for implementing coordinated ringing control of multiple user devices.

FIG. 8 is a flowchart of an exemplary process for implementing coordinated ringing control of multiple user devices according to an implementation described herein. In one implementation, the process of FIG. 8 may be performed by user device 110. In other implementations, some or all of the process of FIG. 8 may be performed by another device or a group of devices separate from user device 110 and/or including user device 110.

As shown in FIG. 8, user device 110 may activate coordinated ringing application (block 802). For example, user device 110 may access coordinated ringing application 302 that may have been previously downloaded or installed on user device 110. Coordinated ringing application 302 may coordinate ringing of multiple user devices 110 registered to a same smart phone number that are within a predetermined proximity of each other. Coordinated ringing application 302 may be launched on user device 110 when a voice and/or video calling application is launched on the user device 110, which has a wireless detection application (such as a Bluetooth™ radio) turned on.

User device 110 may broadcast an identity and a ring state associated with user device 110 (block 804). For example, user device 110 may broadcast a private identity hash associated with user device 110 and an indication of whether the the user device 110 is in an audible ringing state, a vibration only state, a silent state, etc.

User device 110 may detect the presence of additional user devices 110 (block 806). For example, user device 110 may detect the presence of the additional user device(s) 110 via a wireless detection application. User device 110 may compare a private identity hash associated with each of the additional user devices 110 with a private identity hash associated with the user device 110 to determine whether the devices are associated with a single user identity or smart phone number.

At block 808, user device 110 may determine a user device 110 that is to ring based on predetermined rules. For example, user device 110 may peer connect with the additional user devices 110. User device 110 may determine which of the group of user devices 110 is to be designated to ring based on the predetermined rules.

User device 110 may determine activity to be implemented at other user devices 110 based on predetermined rules (block 810). For example, the predetermined rules for other user devices 110 may include that the other user devices 110 are to be silent, vibrate, light up, etc. After a designated user device 110 has been identified to ring based on incoming calls, the additional user devices 110 may mitigate issues based on simultaneous ringing of user devices 110 that receive a same voice or video call when the user devices 110 are in proximity with each other by remaining silent or otherwise reducing the ring volume or time interval between rings.

At block 812, a video or voice call may be placed to the smart phone number associated with the user devices 110 that are within a predetermined proximity of each other. The user device 110 that has been previously determined to be the ringing user device 110 may ring. The additional user devices 110 may be controlled based on the rules determined at block 810. For example, the other user devices 110 may be silent and only visually display that there is an incoming call (block 814).

Systems and/or methods described herein may implement coordinated ringing of multiple user devices registered to a same smart phone number that are within a predetermined proximity of each other. In instances in which a ringing signal is received, the systems may coordinate the ringing across the devices to suppress ringing in all devices except a device most likely to be accessed by the user for the particular call.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software. No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
   accessing, at a first user device, an application that coordinates ringing of multiple user devices registered to a particular telephone number that are within a predetermined proximity of each other, wherein the particular telephone number is a same telephone number for each user device of the multiple user devices;
   broadcasting an identity and a ring state associated with the first user device;
   detecting a presence within the predetermined proximity of at least one additional user device, of the multiple user devices, associated with the particular telephone number;
   determining a single ringing user device, of the at least one additional user device, based on predetermined rules of selection between the at least one additional user device and the first user device, wherein the single ringing user device is to ring upon receipt of an incoming call to the particular telephone number;
   determining activity to be performed by at least one other user device, of the at least one additional user device, in event of an incoming call to the particular telephone number, wherein the at least one other user device includes a device other than the single ringing user device; and
   receiving an incoming call at the particular telephone number and ringing the determined single ringing user device.

2. The computer-implemented method of claim 1, wherein determining the activity to be performed by the at least one other user device further comprises:
   determining that the at least one other user device is to vibrate and not output audible ringing.

3. The computer-implemented method of claim 1, wherein determining the activity to be performed by the at least one other user device further comprises:
   determining that the at least one other user device is to be silent.

4. The computer-implemented method of claim 1, wherein determining the activity to be performed by the at least one other user device further comprises:
   determining that the at least one other user device is to provide a visual indicator of the incoming call.

5. The computer-implemented method of claim 1, wherein determining the single ringing user device further comprises:
   determining the single ringing user device based on motion associated with at least one of the at least one additional user device or the first user device.

6. The computer-implemented method of claim 1, wherein determining the single ringing user device further comprises:
   determining the single ringing user device based on a type of call associated with the incoming call.

7. The computer-implemented method of claim 1, wherein determining the single ringing user device further comprises:
   determining the single ringing user device based on a caller associated with the incoming call.

8. The computer-implemented method of claim 1, wherein determining the activity to be performed by the at least one other user device further comprises:
   determining that an interface is to provide a capability to join an ongoing call at the at least one other user device associated with the particular telephone number.

9. The computer-implemented method of claim 1, wherein determining the single ringing user device further comprises:
   determining the single ringing user device based on a location associated with the at least one additional user device and the first user device.

10. The computer-implemented method of claim 1, wherein detecting the presence within the predetermined proximity further comprises:
    detecting the presence based on instructions input by a user that define a maximum distance of the predetermined proximity.

11. The computer-implemented method of claim 1, wherein detecting the presence within the predetermined proximity further comprises:
    detecting the presence based on instructions input by a user that define a minimum signal strength associated with the predetermined proximity.

12. A first user device comprising:
    a memory to store a plurality of instructions; and
    a processor configured to execute instructions in the memory to:
    access an application that coordinates ringing of multiple user devices registered to a particular telephone number that are within a predetermined proximity of each other, wherein the particular telephone number is a same telephone number for each user device of the multiple user devices;
    broadcast an identity and a ring state associated with the first user device;

detect a presence within the predetermined proximity of at least one additional user device, of the multiple user devices, associated with the particular telephone number;

determine a single ringing user device, of the at least one additional user device, based on predetermined rules of selection between the at least one additional user device and the first user device, wherein the single ringing user device is to ring upon receipt of an incoming call to the particular telephone number;

determine activity to be performed by at least one other user device, of the at least one additional user device, in event of an incoming call to the particular telephone number, wherein the at least one other user device includes a device other than the single ringing user device; and receive an incoming call at the particular telephone number and ring the determined single ringing user device.

13. The first user device of claim 12, wherein, when determining the activity to be performed by the at least one other user device, the processor is further configured to:

determine that the at least one other user device is to vibrate and not output audible ringing.

14. The first user device of claim 12, wherein, when determining the activity to be performed by the at least one other user device, the processor is further configured to:

determine that the at least one other user device is to provide a visual indicator of the incoming call.

15. The first user device of claim 12, wherein, when determining the single ringing user device, the processor is further configured to:

determine the single ringing user device based on motion associated with at least one of the at least one additional user device or the first user device.

16. The first user device of claim 12, wherein, when determining the single ringing user device, the processor is further configured to:

determine the single ringing user device based on a type of call associated with the incoming call.

17. The first user device of claim 12, wherein, when determining the single ringing user device, the processor is further configured to:

determine the single ringing user device based on a caller associated with the incoming call.

18. A non-transitory computer-readable medium including instructions to be executed by a processor, the instructions including one or more instructions, when executed by the processor, for causing the processor to:

access, at a first user device, an application that coordinates ringing of multiple user devices registered to a particular telephone number that are within a predetermined proximity of each other, wherein the particular telephone number is a same telephone number for each user device of the multiple user devices;

broadcast an identity and a ring state associated with the first user device;

detect a presence within the predetermined proximity of at least one additional user device, of the multiple user devices, associated with the particular telephone number;

determine a single ringing user device, of the at least one additional user device, based on predetermined rules of selection between the at least one additional user device and the first user device, wherein the single ringing user device is to ring upon receipt of an incoming call to the particular telephone number;

determine activity to be performed by at least one other user device, of the at least one additional user device, in event of an incoming call to the particular telephone number, wherein the at least one other user device includes a device other than the single ringing user device; and receive an incoming call at the particular telephone number and ring the determined single ringing user device.

19. The non-transitory computer-readable medium of claim 18, further comprising instructions, when executed by the processor, for causing the processor to:

determine the single ringing user device based on motion associated with at least one of the at least one additional user device or the first user device.

20. The non-transitory computer-readable medium of claim 18, further comprising instructions, when executed by the processor, for causing the processor to:

determine the single ringing user device based on a type of call associated with the incoming call.

* * * * *